US009509756B2

(12) United States Patent
Arponen et al.

(10) Patent No.: US 9,509,756 B2
(45) Date of Patent: Nov. 29, 2016

(54) CONTENT STORING DEVICE QUERY

(71) Applicant: Nokia Corporation, Espoo (FI)

(72) Inventors: Jarmo Arponen, Espoo (FI); Antti Lappetelainen, Espoo (FI); Joni Jantunen, Helsinki (FI); Olli Tyrkko, Espoo (FI)

(73) Assignee: Nokia Technologies Oy, Espoo (FI)

( * ) Notice: Subject to any disclaimer, the term of this patent is extended or adjusted under 35 U.S.C. 154(b) by 86 days.

(21) Appl. No.: 14/505,550

(22) Filed: Oct. 3, 2014

(65) Prior Publication Data

US 2015/0026263 A1 Jan. 22, 2015

Related U.S. Application Data

(63) Continuation of application No. 11/800,848, filed on May 7, 2007, now Pat. No. 8,898,128.

(51) Int. Cl.
*G06F 17/30* (2006.01)
*H04L 29/08* (2006.01)
*H04L 12/807* (2013.01)

(52) U.S. Cl.
CPC ......... *H04L 67/06* (2013.01); *G06F 17/30386* (2013.01); *G06F 17/30448* (2013.01); *H04L 47/27* (2013.01)

(58) Field of Classification Search
CPC .................. G06F 17/30386; G06F 17/30448; H06L 67/06; H04L 47/27
USPC ................................ 707/705, 758, 769, 770
See application file for complete search history.

(56) References Cited

U.S. PATENT DOCUMENTS

| | | | |
|---|---|---|---|
| 6,275,856 B1 | 8/2001 | Hirata et al. ................... 709/224 |
| 6,493,104 B1 | 12/2002 | Cromer et al. ............... 358/1.15 |
| 6,819,339 B1 * | 11/2004 | Dowling ............. G06F 17/2247 |
| | | | 707/999.003 |
| 7,075,412 B1 * | 7/2006 | Reynolds ........... G06K 7/10297 |
| | | | 340/10.2 |
| 7,155,517 B1 | 12/2006 | Koponen et al. ............. 709/227 |
| 8,566,192 B2 * | 10/2013 | De Mes ............ G06F 17/30265 |
| | | | 705/35 |
| 2004/0176145 A1 | 9/2004 | Lee et al. ....................... 455/572 |
| 2005/0203890 A1 * | 9/2005 | Chen .................... G06F 17/3056 |
| 2006/0047644 A1 * | 3/2006 | Bocking ........... G06F 17/30964 |
| 2006/0059447 A1 | 3/2006 | Ariyama et al. ................ 716/10 |

(Continued)

FOREIGN PATENT DOCUMENTS

| | | |
|---|---|---|
| GB | 2426838 A | 12/2006 |
| WO | WO-2005-041534 A1 | 5/2005 |
| WO | WO-2006/010271 A1 | 2/2006 |
| WO | WO-2008/039234 A1 | 4/2008 |

*Primary Examiner* — Hares Jami
(74) *Attorney, Agent, or Firm* — Harrington & Smith

(57) ABSTRACT

A method, apparatus, and correspondingly configured computer program, in which a querying device inputs a user an identification of desired content and sends a query request for the desired content to surrounding memory devices. The query request is adapted to cause compatible receiving memory devices to perform a search based on the request. The memory devices are configured to listen to query requests and responsively perform searches based on the queries. Any memory device that finds content according to the query request responds to the query device which, after sending the query request, monitors for the compatible receiving memory devices for information that the queried content is found. Responsive to receiving the information from a given memory device, the querying device establishes a connection with the given memory device and obtains the content.

29 Claims, 5 Drawing Sheets

(56) References Cited

U.S. PATENT DOCUMENTS

| | | | |
|---|---|---|---|
| 2007/0016587 A1 | 1/2007 | Ranger et al. | 707/10 |
| 2007/0078731 A1* | 4/2007 | Hameen-Anttila | G06Q 20/123 705/26.1 |
| 2008/0079573 A1* | 4/2008 | Bloebaum | G06F 17/30876 340/568.1 |

* cited by examiner

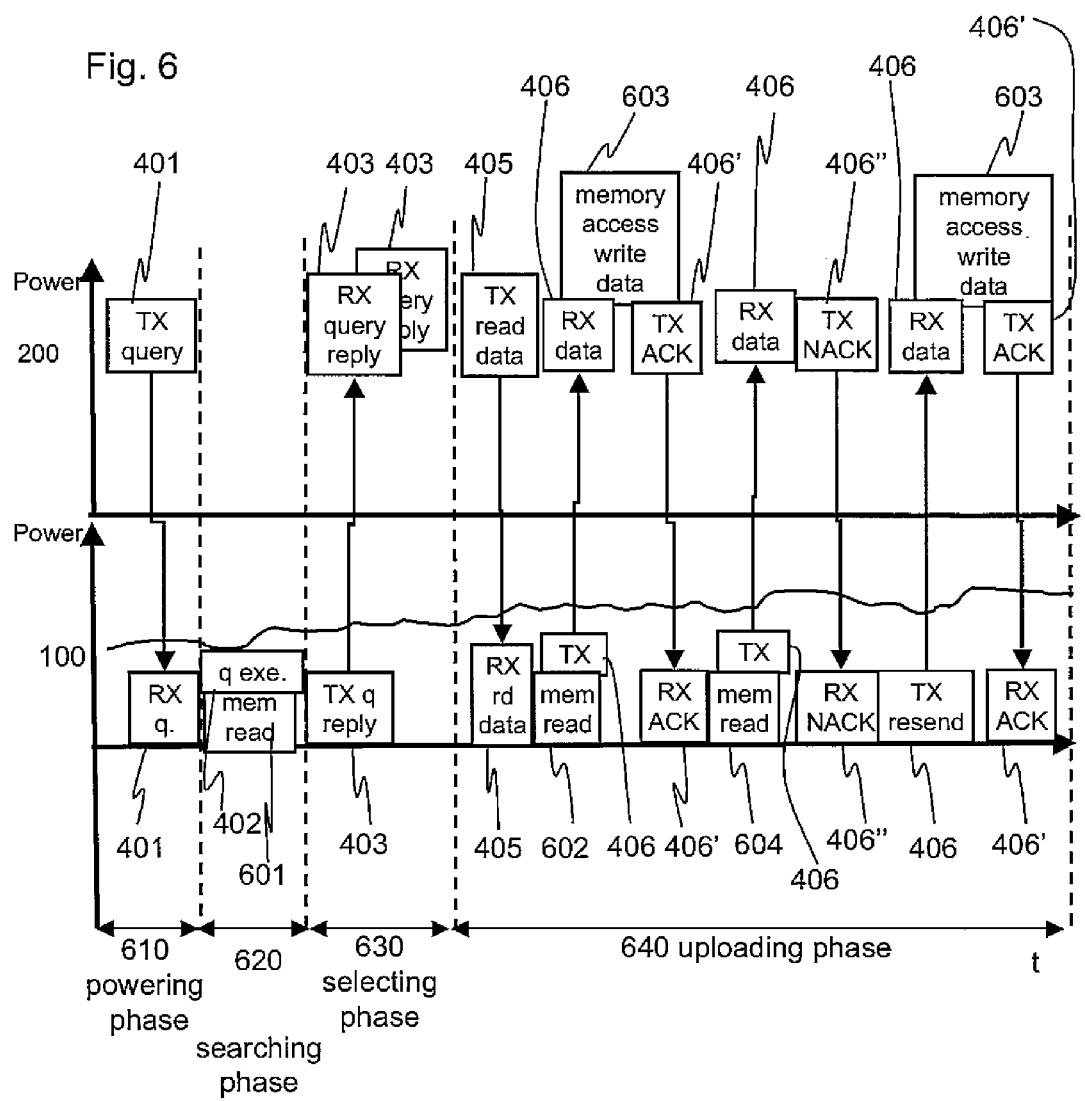

CONTENT STORING DEVICE QUERY

CROSS REFERENCE TO RELATED APPLICATION

This patent application is a continuation of copending U.S. patent application Ser. No. 11/800,848, filed May 7, 2007, the content of which is incorporated by reference herein in its entirety.

FIELD OF THE INVENTION

The present invention generally relates to querying devices storing particular content.

BACKGROUND OF THE INVENTION

Content search poses one of the most challenging human tasks in the modern life. Content is often searched by computer-assisted metadata searches using a computer and a computer network, particularly when the Internet is being searched as a vast global content store. Metadata extensions to actual content data are a known method to ease data management of large systems. For example Web 2.0 is based on a database where metadata is associated as an extension to actual content data i.e. URI. Known metadata searches are implemented with big server farms. To run a global metadata search is a computation intensive task. Typically all possible associations are returned as search results. Often, the users need to define a new more detailed criterion for further processing based on the search result.

New network technologies are introduced ever faster and also for local data storage. Various types of content such as digital camera images and music files are being stored in computers, set top boxes, music players and mobile phones, for instance. Near field communication (NFC) type systems at present store relatively modest amount of data. There are no known techniques to launch local data searches among RFID tags, for instance, which reside within a communication range. NFC tags are instead treated as separate standalone devices.

Given the quickly falling mass storage price and increasingly popular media recorders and players, the amount of locally stored content is rapidly increasing. Unfortunately, the necessary setup of a well working network access between current and new devices is often technically challenging. Further, portable electrical devices with large (gigabyte) memories may overtake in the future personal computers as main storage and access means for digitized information. Moreover, also passive devices (that is, devices without a power source of their own) possess ever larger non-volatile memories only operable when the devices are externally powered. One example of such a technology is the Radio Frequency IDentification that has been known for more than 25 years. Other proximity communications (that is, inter-device communications between within a range from one millimeter to few meters) technologies include NFC, electronic product code (EPC), ISO 18000-4 and Memory spot by Hewlett Packard corp.

If Moore's law realizes in the future development of passive device memories, a single passive device may store data in the magnitude of a gigabyte. Hence, memory management will be difficult to sustain efficiently. It is seen that both energy and processing time are already precious resources at link protocol layer (MAC) of passive devices. Yet digital content should be reasonably usable despite the expanding data amounts. While the data transmission rates are also increasing thanks to enhanced compression and transmission technologies, it can also be assessed that accessing desired local content in a reasonable time is becoming ever more challenging. At worst, even if desired data may reside at hand, there is no reasonable access to the data if it cannot be found for using or sharing with others when desired. Let us assume that there is a video or music clip (item) that a home user knows she has somewhere at her home. She may have data storages in her mobile phone, her child's mobile phone, stereo system, set top box, and further a dynamic hard disk on her computer. To find the item, she should search or browse through the contents in each of these devices one by one and item by item (or possibly folder by folder) with the device's own user interface. Alternatively, some existing service and content discovery arrangement such as Universal Plug and Play (UPnP) designed for internet protocol networks could be used so that one device could be used to search into the storage of other devices. However, no such background art disclosure is known and also the search would take long time if every single device contents should be transferred to the searching device, device by device and item by item or folder by folder, until the desired content (item) is found.

It is an object of the invention to avoid or at least mitigate drawbacks of existing data searching and particularly local data searching.

SUMMARY

According to a first aspect of the invention, there is provided in a memory device a method comprising:
  receiving from a querying device a query request for desired content;
  performing a search based on the request; and
  if content according to the query request is found, responsively establishing a connection with the querying device and informing the querying device of the found content.

Advantageously, numerous ambient memory devices may each receive a common query request without necessarily conducting a preceding mutual connection establishment. The query request may contain one or more search criteria. Further advantageously, plural different memory devices may at least partly simultaneously conduct a search, which may advantageously be a meta-data query, for the desired content. A connection may be established with the querying device to inform of the found content only if content according to the query request is found. No two-way connection needs to be established on sending the query request. Hence, major saving in time may be obtained in comparison to individually connecting to each memory device one by one when plural memory devices are to be queried for the desired content.

It should be appreciated the found content is content that meets with the query request, but the found content may not equal to the desired content. The searched content may, for instance, provide desired song or picture of the child as defined in the query, but the found content may yet be non-identical relative to the query.

In particular, some embodiments of the invention seek to address the following problems:
i) As the amount of content in local memories increases it becomes very inconvenient to upload all content from each local memory to an access device for searching of interesting content. Also the number of local memories may increase, which complicates the issue further.

ii) Accessing the local memory (reading data for transmitting to an access device such as reader or writing received data) in a passive device is power intensive and as passive devices are limited by peak power consumption, accessing the local memories adversely affects on the link ranges.

The memory device may be powered by a wireless signal transmitted by the querying device. The wireless signal that powers the memory device may also carry the query request.

The query request may be broadcast to all memory devices in range, without addressing it to any memory device or set of memory devices in particular. In this embodiment, utility is gained from not requiring established link connections before transmitting the query request.

Advantageously, passive devices may focus in one task at the time if available power does not allow simultaneous querying and transmitting of query results to the querying device. Hence, operating range may improve in comparison to prior arrangements in which the query and transmission should occur at least partly in parallel.

The memory device may be configured to adapt scheduling of querying dynamically based on available power so that when available power suffices, simultaneous querying and data transmission to the querying device are enabled and otherwise querying and data transmission of the found content are performed sequentially.

The query request may be embedded to a link layer command. The link layer command may be a tag selection command.

The method may further comprise the querying device continually and wirelessly powering the memory device to enable the memory device to perform the search.

The method may comprise receiving the query request directly from the querying device.

The memory device may be located at the proximity of the querying device. The query request may be received using proximity communications such as Radio Frequency Identification (RFID) or near field communication.

The memory device may be, for example, a media memory device such as a digital camera, set top box, personal digital assistant, digital camcorder, stereo appliance, memory stick, portable computer, fixed computer, mobile telephone or portable music player.

The querying device may be, for example, a mobile telephone, digital camera, set top box, television, personal digital assistant, portable computer, fixed computer or music player.

The found content may be sent to the querying device automatically on establishing the connection, after establishing the connection, or responsively to receiving a dedicated retrieval message from the querying device.

Advantageously, by automatically transmitting the content on establishing the content or after establishing the content, the content may be typically transmitted to the querying device before the querying device distances too far from the memory device in case that communication between the querying device and the memory device has a limited range. Alternatively, by waiting for the dedicated retrieval message, the memory device may avoid sending conflicting signaling with other memory devices that may also have found the content.

A mobile phone is particularly useful as the querying device with a readily usable user interface for inputting desired content identification and instructing queries for desired content to surrounding memory devices.

According to a second aspect of the invention, there is provided a memory device comprising:

a receiver configured to receive from a querying device a query request for desired content;
a memory comprising electric information content;
a processor configured to perform a search based on the request; and
a transmitter configured to:
  establish a connection with the querying device and inform the querying device of the found content responsively if the content is found.

According to a third aspect of the invention, there is provided a computer program embodied in a memory medium, comprising:

computer executable program code for enabling a memory device to receive from a querying device a query request for desired content;
computer executable program code for enabling a memory device to perform a search based on the request; and
computer executable program code for enabling a memory device, if content according to the query request is found, to responsively establish a connection with the querying device and informing the querying device of the found content.

According to a fourth aspect of the invention, there is provided in a querying device a method comprising:

inputting from a user an identification of desired content;
sending a query request for the desired content to surrounding memory devices, the query request being adapted to cause compatible receiving memory devices to perform a search based on the request; and
monitoring for the compatible receiving memory devices for information that content according to the query request is found and responsive to receiving the said information from a given memory device, establishing a connection with the given memory device and obtaining the content.

The method may further comprise:
receiving identification of each memory device that responds with the information that content according to the query request is found;
selecting supplying memory device from the memory devices from which the identification has been received; and
instructing the supplying memory device to send the found content to the device.

The method may further comprise, after the selecting of the supplying memory device, sending a termination message to cancel the query request.

By canceling the query request, unnecessary querying may be avoided. This is particularly useful if some of the memory devices are battery operated or otherwise resource restricted.

The canceling of the query request may take place after the found content has been received. The canceling may take place after the found content has been received and accepted as the desired content by a user of the querying device.

By subjecting the cancellation to successful delivery of the found content, time may be saved in case that the supplying memory device would not be capable of transferring the found content to the querying device. By further subjecting the cancellation to user approval, parallel queries may continue in case that the user would not approve the found content.

According to a fifth aspect of the invention, there is provided a querying device comprising:

user interface configured to input from a user an identification of desired content;

a transmitter configured to send a query request for the desired content to surrounding memory devices, the query request being adapted to cause compatible receiving memory devices to perform a search based on the request; and a processor configured to monitor for the compatible receiving memory devices for information that content according to the query request is found and responsive to receiving the said information from a given memory device, to establish a connection with the given memory device and obtain the content.

According to a sixth aspect of the invention, there is provided a computer program for controlling a device and embodied in a memory medium, comprising:

computer executable program code configured to enable the device to perform the method of the fourth aspect.

Any foregoing memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

According to a seventh aspect of the invention, there is provided a memory device comprising:

means for receiving from a querying device a query request for desired content;

means for storing electric information content;

means for performing a search based on the request; and means for:

establishing a connection with the querying device and informing the querying device of the found content responsively if content according to the query request is found.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 6 shows an example on an end-to-end data upload operation sequence and link layer signaling between reader and a passive memory device.

DETAILED DESCRIPTION

In the following description, like numbers denote like elements.

An embodiment of the invention is based on first querying by a reader device for surrounding local memory devices (e.g. RFID tags or other memory devices with local memory) for user desired content such as audio and/or video content, receiving query results, selecting content to be transferred and then receiving content according to the query request (that may or may not be the desired content but at least meets the search criteria and is therefore content corresponding with the query request or found content) from a local memory device or local memory devices to the querying device. It should be understood that there are also various different implementations to different phases of this embodiment which each can be freely chosen or combined to other implementations within the scope of the invention.

Figure 1:
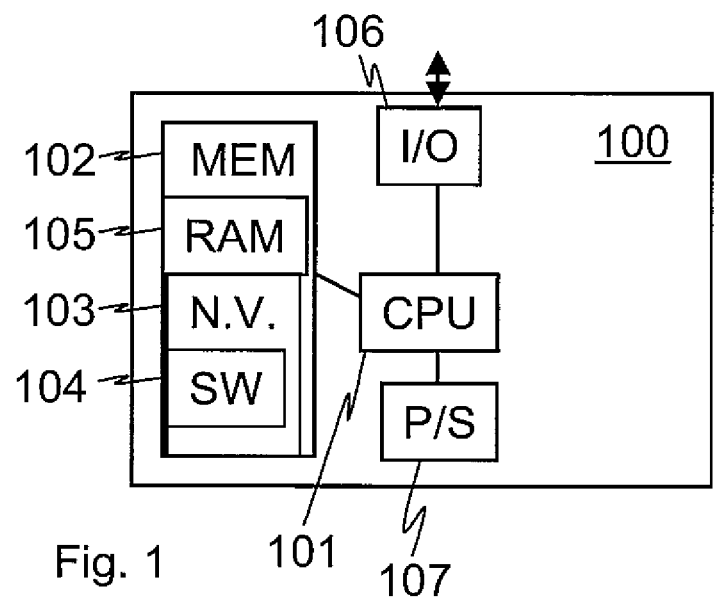
FIG. 1 shows a schematic picture of a local content storing memory device according to an embodiment of the invention.

In support of the following description, the main structure of typical involved elements is described with reference to FIGS. 1 and 2. FIG. 1 shows a schematic drawing of a local content storing memory device, also referred to as a tag, according to an embodiment of the invention. The local content storing memory device 100 (memory device in short) comprises a memory 102 including a persistent memory 103 configured to store computer program code 104 and the terminal's private identity. The persistent memory 103 further stores other data to be maintained in the memory device. The memory device 100 further comprises a processor 101 for controlling the operation of the memory device 100 using the computer program code 104, a work memory 105 within the memory 102 for running the computer program code 104 by the processor 101, an input/output or proximity communication unit 106 such as a Radio Frequency Identification (RFID) module or Near Field Communication (NFC) for communicating with the querying device. The memory device 100 may also contain a (simple) user interface like a display and/or one or more buttons (not shown). The memory device 100 may further comprise a power supply 107 in case it is a self-powered tag (such as an active tag) for longer range and better functionality if needed. The processor 101 is typically a master control unit MCU. Alternatively, the processor may be substantially a microprocessor, a digital signal processor, an application specific integrated circuit, a field programmable gate array, a microcontroller or a combination of such elements.

Figure 2:
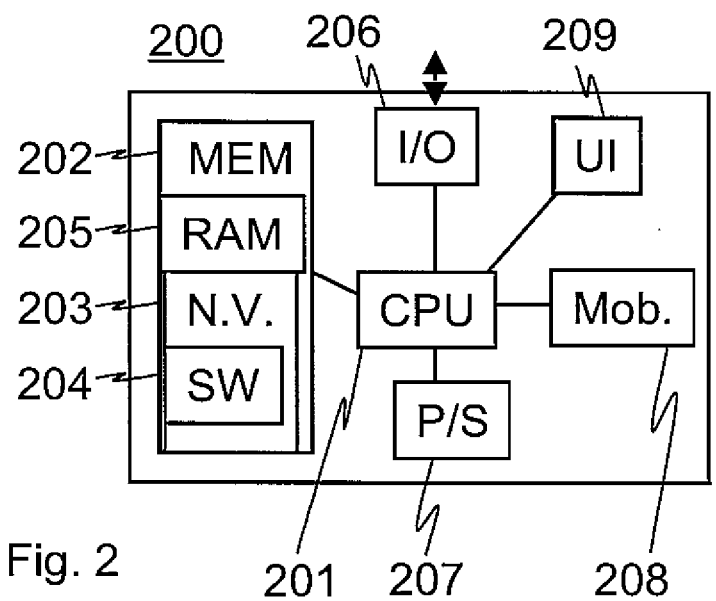
FIG. 2 shows a block diagram of a content querying device according to an embodiment of the invention.

FIG. 2 shows a block diagram of a content querying device, also referred to as a reader device, according to an embodiment of the invention. FIG. 2 presents a processor 201, a memory 202 with work memory and non-volatile memory 203 including software 204 and a local communication unit 206. The components 201 to 206 have functions similar as those of the corresponding components 101 to 106 in FIG. 1 with the exception that typically the querying device is provided with a power supply 207 such as a battery so that the querying device is also capable of running more efficient and complex circuitry than local content storing memory devices, particularly more than passive content storing memory devices. Moreover, the software in the querying device is configured to cause the device to query for content from ambient (surrounding proximate memory devices typically within a distance from millimeter to tens of meters) memory devices. Hence, the elements 201 to 206 have different denotation than elements 101 to 106 even if in some cases the elements may be exactly matching. The querying device may also contain a mobile communications unit 208 such as a cellular telecommunications unit, satellite communications unit, positioning unit and/or wireless data networking unit such as a wireless local area networking unit. The querying device also contains a user interface 209 that typically contains one or more information presentation elements such as a display, speaker, projector and speech synthesizer. The user interface further comprises one or more user input elements such as a keyboard, touch screen, computer mouse, bar code scanner and speech recognizer.

Figure 3:
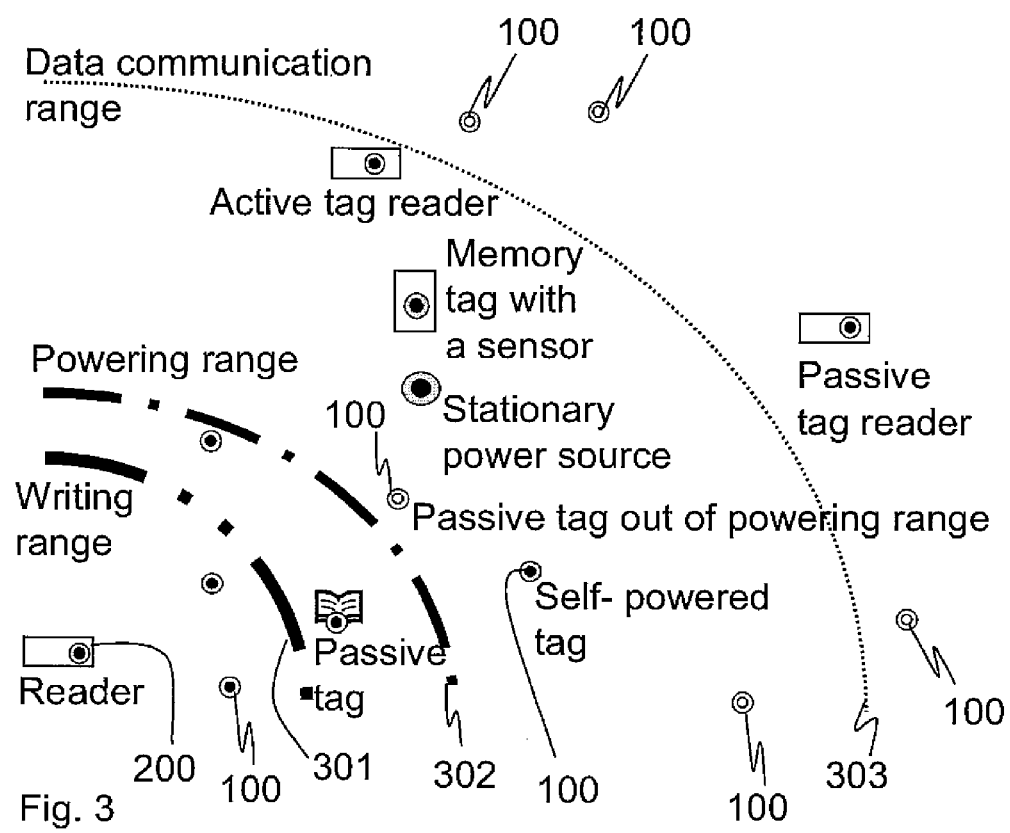
FIG. 3 shows an example of content query in a starting point.

FIG. 3 shows a schematic drawing of a system according to an embodiment of the present invention in which a content search will be performed by the ambient local memory devices or tags 100 responsive to receiving a query request from a tag reader 200. FIG. 3 illustrates three different ranges as boundaries 301, 302 and 303, respectively: closest to the tag reader 200, there is the region 301 in which passive tags 100 receive sufficient power from the tag reader 200 in order to write into their memories. Somewhat larger region 302 illustrates the area in which the passive tags are sufficiently powered to read their memories and communicate with the reader. Still farther, there is the borderline up to which active or self powered tags are able to communicate with the tag reader 200. The active tags need not be powered by the tag reader 200 and thus they are capable of both reading and writing into their memories and communicating with the tag reader up to the boundary 303. The communication range of active tags with the querying device may be extended by providing a synchronization signal.

Figure 4:
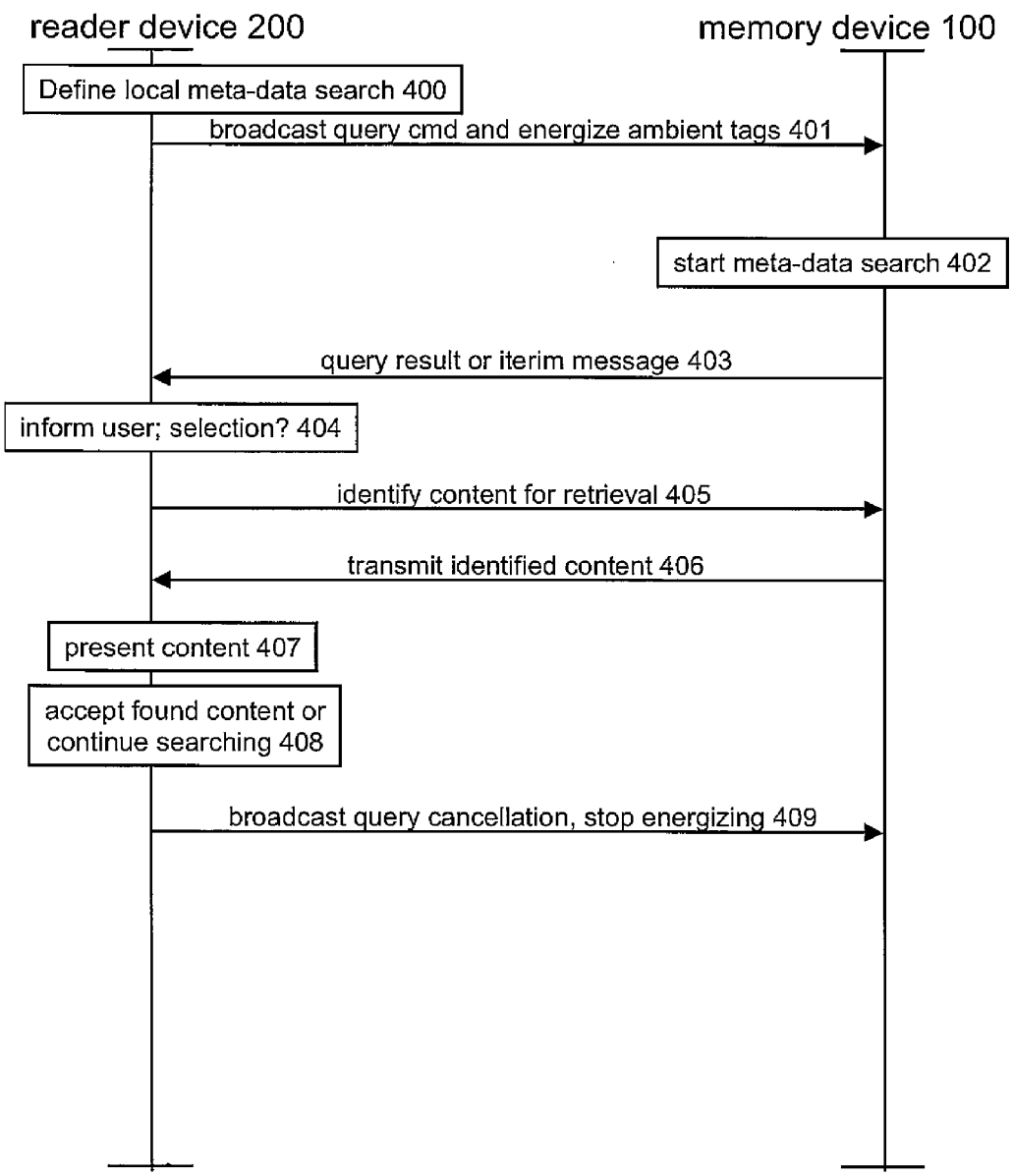
FIG. 4 shows main signaling and events related to the content query between the reader device and the tag.

FIG. 4 shows main signaling and events related to the content query between the querying device 200 and the memory device 100. Before starting a content search or query, the user of the querying device defines a query 400 using the user interface 209 (not shown in FIG. 3). Next, the querying device 200 or particularly the proximity communication unit 206 attempts to select one or more of ambient memory devices (memory devices within reach of the proximity communication unit 206) by broadcasting a query command 401 (the query command may be directed to data contents or associated metadata), preferably on link layer level. Also energizing radiation may be transmitted together with the query command, if the memory devices are not self-powered. All memory devices 100 that are within the link range may receive the query command. The memory devices responsively start a search 402 on their storage. Typically, only the memory devices with matching content will reply to the query command.

After sending a query command, the querying device may idle until it receives one or more responses. The responses may be query results or interim messages such as indications of query status, energizing need indications (that energizing radiation is needed, or that the energizing radiation is no longer needed).

If passive memory devices are included into a search, that is, if the querying device so assumes, is so instructed or receives an energizing need indication as a message 403, the querying device 200 may continue to power those devices.

Each ambient memory device runs a memory content search much like a query would be locally launched independent of other ambient devices. On finding a matching content (searched content or hit), the memory device may send a response to the query such as the query result or interim message 403 and continue or not continue to search for further hits. Uploaded responses may also contain the status of the search at the responding memory device in relation to the present query and parameters necessary to setup a point-to-point connection for transferring the found content. The received parameters enable automatic data connection setup to a responding memory device typically at the link layer. The optionally generated intermediate status of a query and/or an indication of the found content may be provided to the user of the reader device with its UI 209 to allow the user to select whether to fetch the content, see event 404.

If the user selects not to retrieve the content, the query may simply continue if not all the memories of the ambient memory devices 100 have been fully searched yet. If the search ends without any match being found, the memory device 100 may send a failure notification as message 403 to the querying device 200. On the other hand, if the user selects to retrieve the content, a retrieval message 405 is sent to the memory device 100 with parameters obtained from message 403. Responsively, a connection is formed between the querying device 200 and the memory device 100 and the content is transferred 406 to the querying device 200. On the application level, the querying device need not even know the source of the received content data if the search is instructed and results transferred automatically based on link-layer interaction between the querying device and the ambient memory devices, unless the progress of the search and possible hits are to be previewed by the user. After transmission of the content, the querying device may present the content 407 with the UI 209. The user may then be prompted to indicate whether the found content meets with the user's needs. If the user accepts the found content, a cancellation message is broadcasted 409 to the ambient memory devices in order to stop them from running in vain. This is useful as unnecessary power consumption may be stopped, particularly if any of the ambient memory devices is an active memory device. Alternatively or in addition to sending the cancellation message, the reader device 200 may simply stop the energizing so as to spare energy and/or stop the search in passive devices. On the other hand, if the user disapproves the content received, the query may simply be let to proceed at all the memory devices which still have not yet completed their searches. The memory devices may be configured to maintain for a predetermined time or number of searches a status of uncompleted search or searches so that they may continue a previous search if so instructed by the reader device 200.

It should be appreciated that the querying device may allow the user to initiate more than one parallel search in which case the results for each query may be grouped together for presentation as meaningful sets to the user.

Whilst in FIG. 3 the local content storing memory devices are typically proximity communications devices such as radio frequency identification (RFID) or near field communication (NFC) devices, also other direct links are usable, including Bluetooth. In case of Bluetooth, a session description protocol file may be added by signaling to perform a query.

In order to enable placing a query command at the link layer, the link layer should be implemented in both the querying device 200 and memory devices 100 so that the query command may be relayed to the memory devices 100 in a message before a connection is made. A connect message is one suitable candidate that may be so adapted. Further, the link layer (MAC) protocol may be adapted so that a memory device is able to schedule the mass storage accessed for example not to overlap in time with data transmission or reception activities of the memory device, when available peak power is lower than needed energy to run those functions in parallel. The adaptation of the link layer may involve reserving access slots for memory devices such that sufficient time is left between the slots to perform the query without necessarily searching and communicating simultaneously at memory devices 100. Further, the link layer may be adapted so that the link layer indicates to the memory device 100 whether data access and transfer are enabled by the received power (in case of passive memory devices). Correspondingly, the link layer should then enable to instruct the querying device 200 of any adaptation to data transmission scheme being applied. The link layer may use a default duty-cycle scheduling as default on establishing a connection and then adapt the scheduling dynamically during the connection.

Figure 5A:
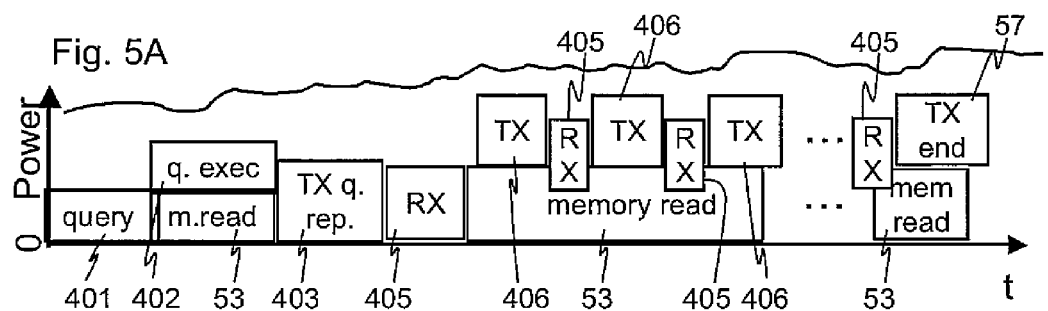
FIGS. 5A to 5D show examples of a power aware passive device's operation in different powering conditions.
Figure 5B:
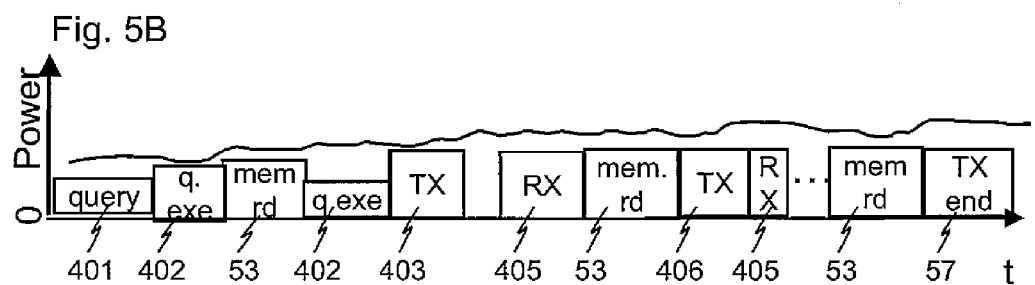
Figure 5C:
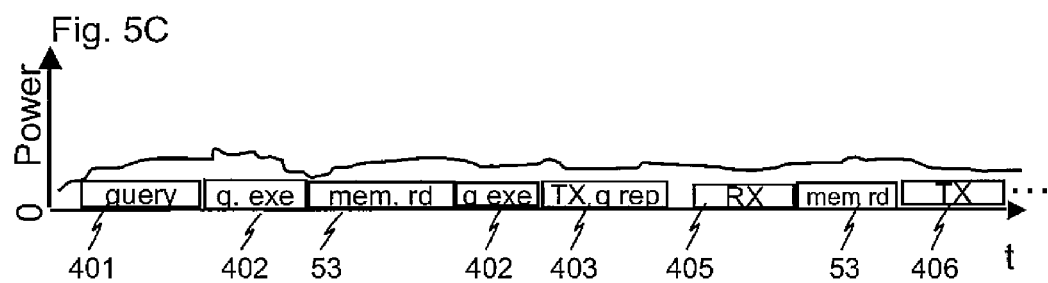
Figure 5D:
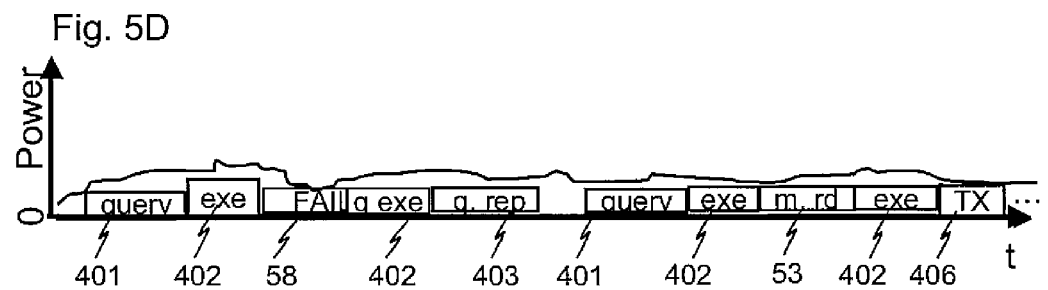

FIGS. 5A to 5D show examples of a power aware passive device's operation in different powering conditions. The power available to the passive device is depicted as diminishing from each of these figures to the next figure as would be the case if similar memory devices were observed at different distances and/or channel conditions from the reader device. Starting from FIG. 5A, there is ample of available power so that after receiving over the air a query request 401, the tag 100 executes the query 402 and accesses its memory 53 by reading data in accordance with the query. That the two operations are performed in parallel causes an increased power draw but the total power consumption still remains well within the power received from the querying device. In addition to the events and signals depicted with reference to FIG. 4, FIG. 5A shows the event end transmission 57 at which phase the tag 100 ends transmitting the found content to the reader device 200. Further, in FIG. 5D there is an event query fail 58 after which the tag 100 attempts the query again when power suffices.

FIG. 6 shows an example on an end-to-end data upload operation sequence and link layer signaling between a querying device and a passive memory device. FIG. 6 describes an implementation of a querying device and a passive memory device operation sequence and key control signaling. Four main phases 610 to 640 illustrate some details of this implementation. At start of the process illustrated by FIG. 6, the querying device 200 starts power transmission (distributed memory powering). This phase is referred to as powering phase 610 and further involves broadcasting a query 401. When power is available to the memory device 100, the memory device's receiver is activated and the query 401 is received In the second phase 620, the querying device continues to transmit power to ambient memory devices. Any energized memory device in range (one exemplified) executes 402 the received query such as, for example, "find video type of content". The memory device 100 reads 601 its memory on executing the query and the process then advances to the next phase that is a selecting phase 630. Notice: as described in FIGS. 5A to 5D, if enough peak power is available then memory read and data comparison may be performed simultaneously.

In the selecting phase 630, the memory device 100 transmits a reply message 403 in response to the query 401. The memory device 100 only replies if the query is met (e.g. a searched string or type is found from the memory of the memory device 100. The memory device may also send a reply in certain other cases such as to send an interim message such as an indication of query status, to acknowledge 406' a message from the querying device 200 or if an operation has failed (message 406") for example too low peak power available). A failure message may also contain an indication of the cause of the failure. The query reply message 403 may have also information of peak power level available to the memory device 100 for the purpose of adjusting a MAC layer operation between the memory device 100 and the querying device 200. Armed with the reply 403 from one or more memory devices 100, the querying device next selects a device or devices to set up data upload communication. The querying device 200 may also repeat a query to any memory device which replies with a failure message (query execution failed, this message is not shown in FIG. 6).

Next, the uploading phase 640 begins (if any hits were found) and the querying device 200 sets up a data upload sequence by sending a data read request 405 with a device ID number and possible metadata such as other variables besides the query command. The memory device responds by reading 602 the memory 102 and then sending back 406 to the reader device 200 the selected content or a portion (e.g. one data packet) of the content. If data transmission is successful, an OK acknowledgement 406' is sent back to the memory device 100. On receiving the ack 406', the memory device 100 may continue to send 406 another part of the selected data and receive yet another ack 406' or nack 406".

If a transmission of selected content or any part thereof fails, a nack 406" is sent back to the memory device 100 so that the memory device may resend 406 the data.

On receiving data from the memory device 100 or memory devices 100, the querying device writes the received content 603 into the memory 202 for presenting to the user.

A person ordinarily skilled in the art understands that various embodiments described in the foregoing are freely adaptable and combinable. Some further embodiments involve presenting to the user at the querying device a growing hit list that reflects the progress of the query, presenting to the user an indication of the progress either with continual updates or updates whenever an indication of a hit is received from a memory device. Moreover, the memory devices 100 may provide the querying device with an indication of their memory size and/or the amount of memory allocated to data content generally or to the type of content that corresponds to the present query. Further, the querying device may be configured to allow the user to add query criteria so that already found hits are correspondingly filtered at the reader device and an update query command is broadcast to ambient memory devices 100 in order to avoid unnecessary data transfer and to accelerate the finding and subsequent retrieval of desired content from an ambient memory device 100.

In case where the querying device is accessing multiple devices, known collision control methods may be used. Then, the querying device 200 may set up the upload sequence using a device ID number (or other unique metadata received in reply message, for example). More metadata variables besides just a search string may be added into this new device specific data read request. Finally, a tag 100 selected by the reader device 200 uploads the desired content to the querying device 200. The querying device 200 may, for instance, fetch six a clock News from a memory device that possess that video or audio clip and a presentation video about the owner of an ambient memory device.

In the foregoing, particular attention has been paid to adapt both air interface and memory access to limited peak power budget in a passive device. Power hungry operations at a passive memory device side may be scheduled so that end-to-end operation is maintained as long as possible without new connection setups. The end-to-end system performance should be (near) optimum to a given power level. In adapting to power, the communication performance adapts to power and not vice versa.

Different aspects and embodiments of the invention provide numerous advantages as is appreciated from the foregoing description. In the following, some of the advantages are summarized:

Easy access to digitized content stored in multiple devices unknown to the device used for accessing the content Avoiding additional setup between data source i.e. memory device and a data storing devices (e.g. memory devices 100 such as, for example, tags)

Memory access and content access are separated and need not depend on each others implementation so that compliant equipment may be simple and economical to design and manufacture Very low energy consumption may be achieved thanks to low link layer signaling, data transmission and data processing activity MAC protocol may employ variable data transmission rates to adapt data transmission according to changing needs Simple streaming type of end-to-end high level data access is enabled so that data presentation may be started before all of the content has been transferred from a memory device to the reader device Major investments to ambient intelligent infrastructure may be avoided and relatively inexpensive passive memory devices only need data access to interoperate with various kinds of electrical devices Relatively fast and accurate search results may be gained The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
   in a memory apparatus, wirelessly receiving from a querying device a query request for desired content;
   performing a search in the memory apparatus in response to the received request; and
   in response to locating during the search content according to the query, establishing a connection with the querying device and sending a response message to inform the querying device of the located content,
   where the response message comprises information descriptive of parameters necessary for the querying device to establish a point-tint wireless connection with the memory apparatus to transfer the located content from the memory apparatus to the querying device.

2. The method according to claim 1, further comprising terminating the search after informing the querying device of the located content.

3. The method according to claim 1, further comprising continuing the search after informing the querying device of the located content.

4. The method according to claim 1, where the response message further comprises information descriptive of a current status of the search.

5. The method according to claim 1, where the information descriptive of parameters necessary for the querying device to establish a point-to-point wireless connection with the memory apparatus comprises information descriptive of link layer parameters necessary for the querying device to establish a point-to-point wireless connection with the memory apparatus to send a retrieval message to the memory apparatus, where receipt of the retrieval message by the memory apparatus causes the memory apparatus to transfer the located content to the querying device.

6. The method according to claim 1, further comprising, in response to receiving a cancellation message from the querying device, terminating the search.

7. The method according to claim 1, further comprising, in response to receiving a message from the querying device to resume a previously uncompleted search, resuming the previously uncompleted search in accordance with uncompleted search status information that is stored in the memory apparatus.

8. The method according to claim 1, where the search is performed in the memory apparatus independent of any search that is performed simultaneously by at least one or more other memory apparatus that are also wirelessly connectable to the querying device, where the memory apparatus and the at least one or more other memory apparatus each receive the same query request in a message broadcast by the querying device.

9. The method according to claim 1, performed as a result of execution of computer program code by at least one processor, the computer program code being stored in the memory apparatus.

10. The method according to claim 1, further comprising maintaining in the memory apparatus information descriptive of a status of any uncompleted searches to enable an uncompleted search to be resumed by the memory apparatus when requested by the querying device.

11. An apparatus, comprising:
    a receiver configured to wirelessly receive from a querying device a query request for desired content;
    a memory comprising information content;
    a processor configured to perform a search of the memory based on the received query request; and
    a transmitter configured to establish a wireless connection with the querying device to send a response message to inform the querying device of content that is located in the memory in response to performing the search based on the query request,
    where the response message comprises information descriptive of parameters necessary for the querying device to establish a point-to-point wireless connection with the memory apparatus to transfer the located content from the memory apparatus to the querying device.

12. The apparatus according to claim 11, where the processor is further configured to terminate the search after informing the querying device of the located content.

13. The apparatus according to claim 11, where the processor is further configured to continue the search after informing the querying device of the located content.

14. The apparatus according to claim 11, where the response message further comprises information descriptive of a current status of the search.

15. The apparatus according to claim 11, where the information descriptive of parameters necessary for the querying device to establish a point-to-point wireless connection with the memory apparatus comprises information descriptive of link layer parameters necessary for the querying device to establish a point-to-point wireless connection with the memory apparatus to send a retrieval message to the memory apparatus, where receipt of the retrieval message by the memory apparatus causes the memory apparatus to transfer the located content to the querying device.

16. The apparatus according to claim 11, where the processor is further configured, in response to receiving a cancellation message from the querying device, to terminate the search.

17. The apparatus according to claim 11, where the processor is further configured, in response to receiving a message from the querying device to resume a previously uncompleted search, to resume the previously uncompleted search in accordance with uncompleted search status information that is stored in the apparatus.

18. The memory apparatus according to claim 11, where the processor is further configured to perform the search in the apparatus independent of any search that is performed simultaneously by at least one or more other apparatus that are also wirelessly connectable to the querying device, where the apparatus and the at least one or more other apparatus each receive the same query request in a message broadcast by the querying device.

19. The memory apparatus according to claim 11, where the processor is further configured to maintain, in the memory, information descriptive of a status of any uncompleted searches to enable an uncompleted search to be resumed by the processor when requested by the querying device.

20. A method, comprising:
in a querying apparatus, inputting from a user via a user interface an identification of desired content;
sending by a wireless transmission a query request for the desired content to a plurality of memory devices within transmission range of the querying device, the query request configured to cause memory devices that receive the query request to perform a search of internal memory based on the query request;
monitoring for a wireless transmission from at least one of the memory devices, the wireless transmission from the at least one of the memory devices comprising a response message indicating that content according to the query request was located during the search of internal memory by the memory device that transmitted the response message; and
in response to receiving the response message, establishing a wireless connection with the memory device that transmitted the response message in order to transmit a retrieval message to obtain the content that was located during the search of internal memory by the memory device,
where the received response message comprises information descriptive of parameters necessary for the querying apparatus to establish a point-to-point wireless connection with the memory device in order to transfer the located content from the memory device to the querying apparatus.

21. The method according to claim 20, further comprising receiving at least one additional response message from the same memory device indicating that additional content according to the query request was located during a continued search of internal memory by the memory device.

22. The method according to claim 20, where the received response message comprises information descriptive of a current status of the search by the memory device.

23. The method according to claim 20, where the information descriptive of parameters necessary for the querying apparatus to establish a point-to-point wireless connection with the memory device comprises information descriptive of link layer parameters necessary for the querying apparatus to establish a point-to-point wireless connection with the memory device to transmit the retrieval message to the memory device to cause the memory device to transfer the located content to the querying apparatus.

24. The method according to claim 20, further comprising transmitting a cancellation message to the memory device to cause the memory device to terminate the search of internal memory.

25. The method according to claim 20, further comprising transmitting a message to the memory device to resume a previously uncompleted search in accordance with uncompleted search status information that is stored in the memory device.

26. The method according to claim 20, further comprising wirelessly transmitting a plurality of query requests to initiate a plurality of simultaneous memory searches by each of the plurality of memory devices.

27. The method according to claim 20, in response to receiving the response message first informing the user of the located content via the user interface, and where establishing the wireless connection with the memory device that transmitted the response message is performed only if the user selects to receive the located content.

28. The method according to claim 20, performed as a result of execution of computer program code by at least one processor that is embodied within the querying apparatus, the querying apparatus comprising at least one wireless transmitter and at least one wireless receiver for performing the method.

29. The method according to claim 20, in response to receiving the response message from one of the plurality of memory devices, informing the user of the located content via the user interface, and if the user selects to receive the located content, transmitting a cancellation message to the plurality of memory devices to cause each one of the plurality of memory devices to terminate the search for the desired content in the internal memory.

* * * * *

UNITED STATES PATENT AND TRADEMARK OFFICE
CERTIFICATE OF CORRECTION

| | |
|---|---|
| PATENT NO. | : 9,509,756 B2 |
| APPLICATION NO. | : 14/505550 |
| DATED | : November 29, 2016 |
| INVENTOR(S) | : Arponen et al. |

Page 1 of 1

It is certified that error appears in the above-identified patent and that said Letters Patent is hereby corrected as shown below:

In the Claims

Claim 1, Column 11, Line 54 "point-tint" should be deleted and --point-to-point-- should be inserted.

Signed and Sealed this
Seventeenth Day of January, 2017

Michelle K. Lee
*Director of the United States Patent and Trademark Office*